Patented Nov. 27, 1951

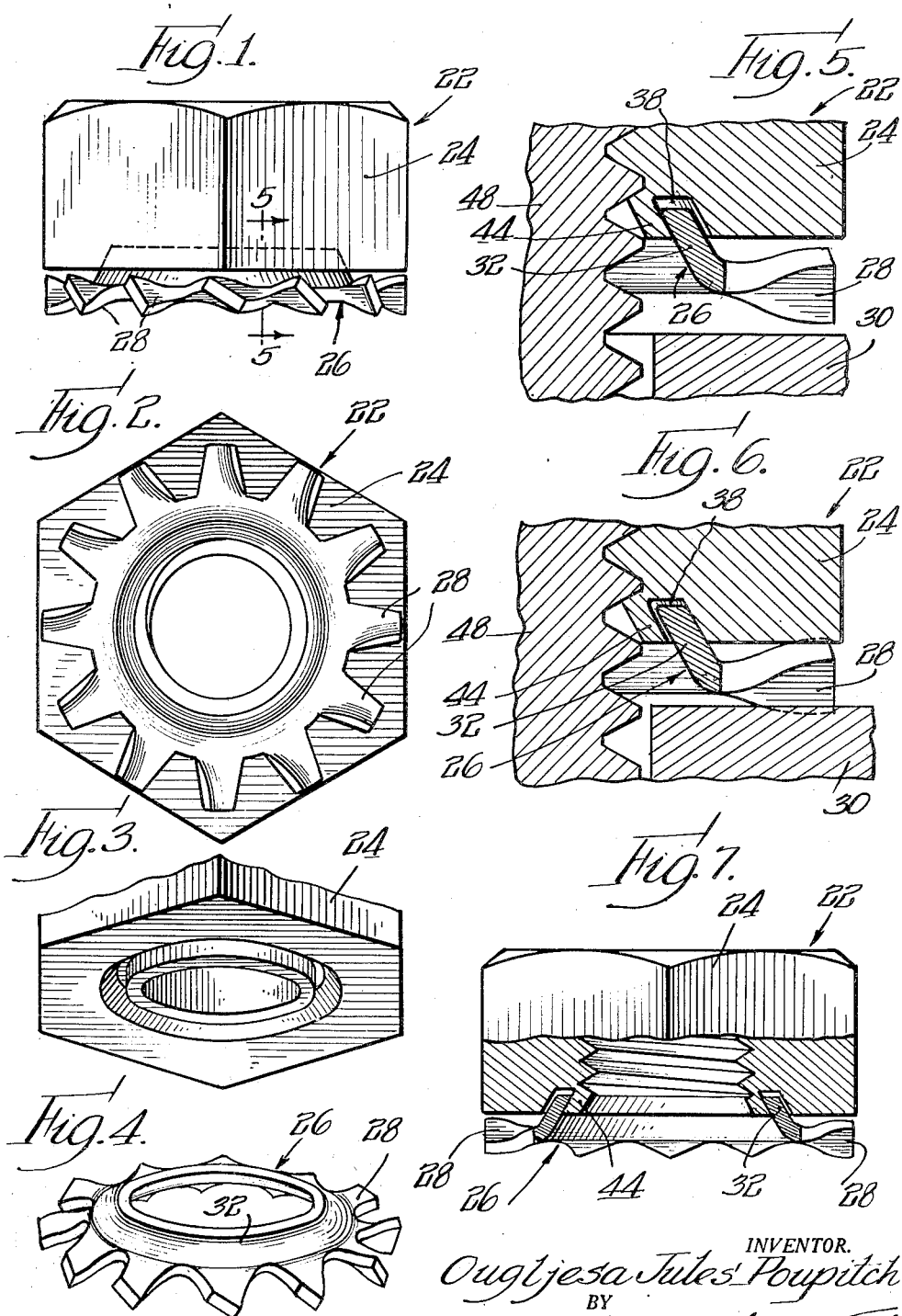

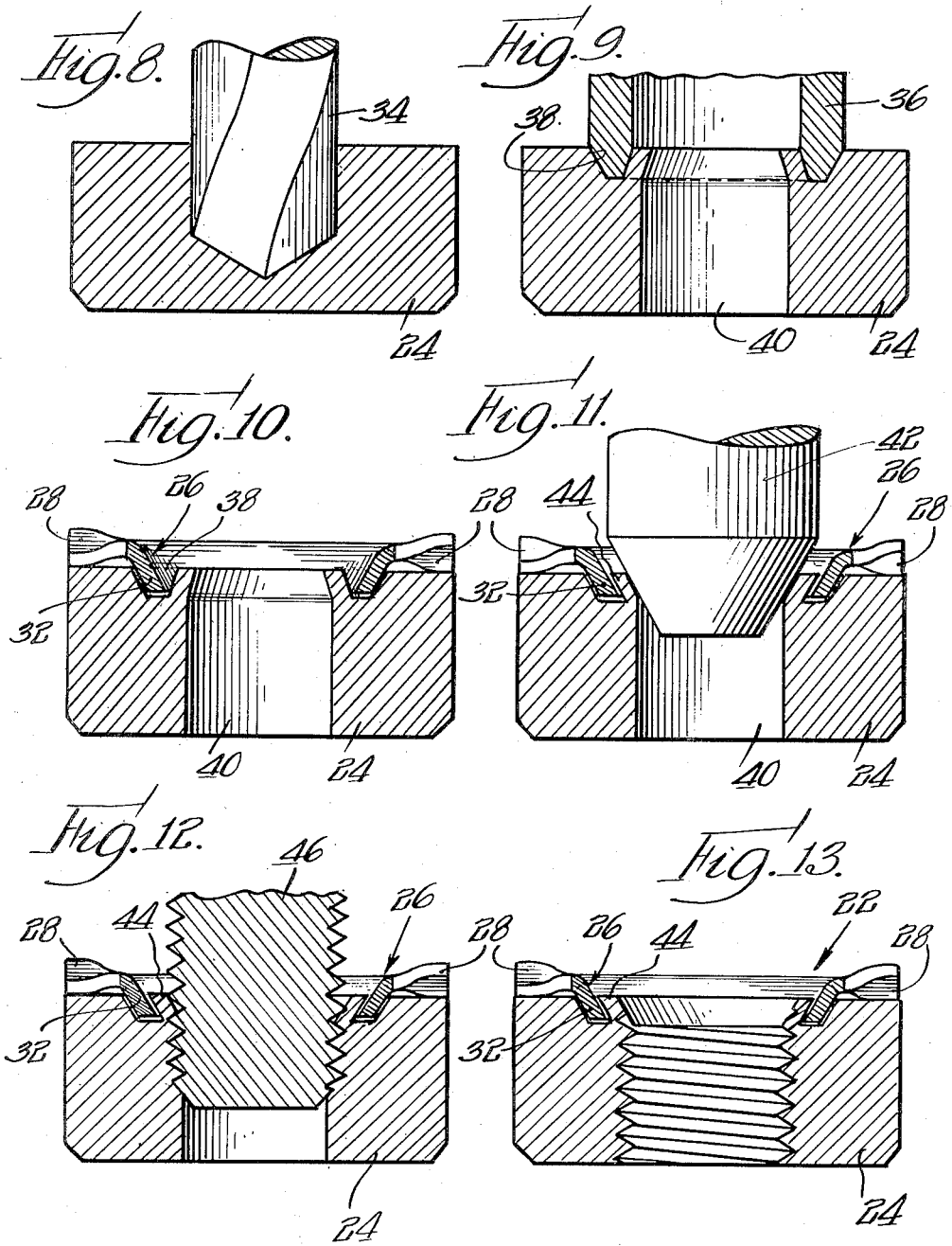

2,576,906

UNITED STATES PATENT OFFICE 2,576,906

FASTENER UNIT

Ougljesa Jules Poupitch, Chicago, Ill., assignor to Illinois Tool Works, Chicago, Ill., a corporation of Illinois Application July 22, 1949, Serial No. 106,255

5 Claims. (Cl. 151—37)

This invention relates to fastener units and aims to provide a preassembled nut and lock washer, and more particularly a preassembled unit in which the lock washer is of the toothed type.

The effective locking action of toothed lock washers has long been recognized and such washers are in wide commercial use. In spite of the great convenience and saving which could be obtained by providing a preassembled nut and lock washer, and although nut and lock washer units containing toothed lock washers have heretofore been suggested, they have not come into commercial use. I have discovered that nut and toothed washer units formerly suggested have had one outstanding defect in that the means by which the washer was secured to the nut prevented efficient operation of the washer.

I have found, for example, that nut and lock washer assemblies of the prior patented art have had faults which the fastener unit of the present invention is designed to overcome. It is essential in nut and washer assemblies that no interference exist with the proper compression of the washer, and in instances where certain types of toothed lock washers are employed having locking teeth projecting beyond the bounding planes of the washer body, such lock washers should not be held against rotation with respect to the nut. It is also important that the washer member be maintained concentric with the nut when the washer is compressed.

It is therefore a special object of the present invention to avoid the above mentioned and other defects of the prior art and to provide for permanently securing a lock washer as, for example a lock washer of the toothed type, under the clamping surface of the nut in a way which does not interfere with the effective operation or locking efficiency of the washer. A further object is to provide a construction for the purpose suggested above which is simple and can be manufactured at low cost. It is a further object of the present invention to provide a nut and lock washer assembly in which the external diameter of the washer member may be held to a minimum, whereby to assure maximum tooth engagement with the clamping surface of the rotary threaded fastener.

To achieve the foregoing objects and advantags in accordance with the present invention, an externally toothed lock washer is provided which has all or a large part of its internal annular body formed so that it lies at one side of the median plane of the teeth of the washer. The clamping surface of the nut is formed so as to receive the internal margin of the washer body and hold it coaxial with the nut while leaving it free for rotary movement and limited axial movement. It is proposed to couple the washer body and nut by providing projections extending in opposite radial directions, that is, one inwardly and the other outwardly and located so that by engagement with each other they limit movement of the washer body away from the nut and yet hold it permanently against separation from the nut. Owing to the lateral displacement of a substantial part of the internal washer body, it is possible to place the restraining projection formed on the nut wholly at one side of the median plane of the roots of the washer teeth when the teeth are against the clamping face of the nut. In this way, a connection between the washer and nut is provided which in no way interferes with, but in fact enhances, the compression of the washer when the nut and washer are screwed against the work surface. Also, the connection permits free limited movement of the washer body axially towards the nut during such compression, yet guiding it to maintain concentricity between the nut and washer.

The connection between the offset or laterally displaced part of the washer body and the nut may take a number of different forms. One form, for example, which presents certain functional advantages includes a washer body of conoidal or frusto-conical form held within an annular groove provided in the clamping surface of the nut. In this form the washer is held to the nut by a retaining flange in the groove of the nut which projects radially from a wall of the groove and does not extend axially beyond the clamping face of the nut. This type of connection is so far as I am aware entirely new and constitutes a feature of my invention which is of wide application.

The present invention also contemplates methods of manufacture whereby the annular groove at the clamping side of the rotary threaded member for accommodating the attachment part of the washer body may be relatively shallow, thereby holding to a minimum the amount of stock which must be displaced in forming the groove. This relatively shallow groove in combination with the radially swageable or expandible section defining the inner side of the groove makes it possible to preliminarily position the attachment part of the washer body within the groove and subsequently form the retaining shoulder by outwardly swaging or expanding the annular section of relatively small cross-section at the clamping side of the threaded member.

The foregoing and other objects and advantages will be more apparent from the following detailed disclosure, wherein—

Fig. 1 is a side elevational view of a nut and lock washer assembly constructed in accordance with the teaching of the present invention, the internal body portion of the lock washer element being of conoidal or frusto-conical form;

Fig. 2 is a view of the underside of the fastener unit shown in Fig. 1;

Fig. 3 is a fragmentary perspective view showing the annular groove provided at the clamping side of the nut for accommodating the lock washer body;

Fig. 4 is a perspective view disclosing the lock washer disassociated from its companion nut;

Fig. 5 is an enlarged fragmentary sectional view taken along the line 5—5 of Fig. 1, illustrating the relative position of the lock washer and nut just prior to clamping engagement with a work piece;

Fig. 6 is a view similar to Fig. 5 showing the nut and lock washer assembly tightened against a work surface;

Fig. 7 is a side view of the fastener unit similar to Fig. 1 with the lower half of the unit broken away more clearly to illustrate the connection between the washer and nut; and Figs. 8–13, inclusive, illustrate steps in a method of assembling the nut and washer, Fig. 8 disclosing the drilling operation, Fig. 9 the groove forming operation, Fig. 10 the preassembly of the lock washer in the previously formed groove, Fig. 11 the step of shifting one wall defining the annular groove so as to overlie the outer margin of the washer body, Fig. 12 the tapping operation, and Fig. 13 the completely assembled nut and washer.

Referring now to the drawings more in detail, wherein like numerals have been employed to designate similar parts through the various views, it will be seen that one embodiment of the invention, as illustrated in Figs. 1 to 12, inclusive, consists of a fastener unit or preassembled nut and lock washer designated generally by the numeral 22. This fastener unit 22 includes a nut member 24 and a sheet metal lock washer designated generally by the numeral 26. The lock washer 26 includes a plurality of resilient radially extending prongs 28, each prong being deflected or twisted so as to present locking teeth positioned out of the median plane of the roots of the prongs. Thus, the prongs 28 present a plurality of circumferentially disposed teeth extending beyond one side of the median plane of the roots of the prongs for engagement with the clamping surface of the nut 24, and a plurality of teeth oppositely positioned out of said median plane for engaging a surface of a work piece 30.

The lock washer 26 also includes an inner body 32 preferably of conoidal or frusto-conical shape. One margin of the annular conoidal body 32 carries the prongs 28 and the opposite or free margin of said body presents an attachment portion lying at one side of said median plane of the prong roots.

In order to more clearly appreciate the manner in which the attachment portion of the body 32 cooperates with a complementary attachment portion of the nut at the clamping face thereof, reference is now made to the steps in the method of assembly illustrated in Figs. 8 to 12, inclusive. In these figures the nut is shown in an inverted position as compared with the disclosure in Figs. 1 to 7, inclusive, for the reason that the normal application of tools would be downwardly against the clamping face of the nut member. The first step in the method of manufacture would be a drilling operation, as illustrated in Fig. 8. The drill is indicated by the numeral 34. Following the drilling operation a punch 36, Fig. 9, is employed to form an annular groove 38. It will be noted that during this groove forming operation the inner margin of the material defining the aperture 40 is forced inwardly. Following disassociation of the tool 36 from the nut 34, the lock washer member 26 is preliminarily associated with the nut, the free margin of the axially displaced washer body 32 resting within the groove 38. A suitable tool or mandrel 42 is then inserted within the aperture 40 so as to shift or swage the inner wall defining the groove into overlapping relation with respect to the washer body 32. This overlapping portion of the nut constitutes a retaining shoulder or skirt portion 44. In this operation the material of the nut is not clamped against the washer body, sufficient clearance being provided to enable free rotation of the washer with respect to the nut, but rather the skirt portion 44 is radially shifted outwardly to reduce the width of the entrance to the groove 38 and to approach and thus underlie the adjacent surface of the retaining section 32. A tap 46 is then introduced to form the thread in the nut. Fig. 13 discloses the nut and washer in final assembled position.

From the foregoing it will be apparent that the annular body of the washer is positioned to one side of the median plane of the washer teeth or prongs, and that the attaching portion or shoulder 44, while it overlaps and underlies the complementary inwardly extending portion or shoulder of the washer body 32, does not extend beyond the clamping face of the nut and does not frictionally engage the washer body to an extent which would prevent free rotatability of the washer with respect to the nut.

In Fig. 5 the fastener unit 22 is shown just prior to the clamping engagement thereof with a work piece 30, and the nut 34 is mounted upon a screw member 48. However, to assist in initially assemblying the nut and screw, it is to be noted that both the skirt portion 44 and the conoidal annulus section 32 are outwardly inclined with respect to the nut axis so as to provide flared openings which facilitate registration of a screw with the threaded bore of the nut. In this position the outwardly swaged shoulder 44 coacts with the complementary internal conical surface of the washer body 32 to prevent axial separation of the washer and nut. It will also be noted that sufficient clearance is provided between the walls of the groove 38 and the surfaces defining the body 32, so as to permit relative axial movement between the washer and the nut during the tightening operations. Thus, as the unit 22 is moved from the position shown in Fig. 5 to the position shown in Fig. 6, the oppositely disposed teeth of the prongs 28 lockingly engage the clamping surface of the nut on one side of the median plane of the prong roots and the work piece 30 on the opposite side. In this position the outermost wall defining the annular recess 38 abuts the complementary external conical surface of the body 32 so as to maintain concentricity of the washer and nut. Also, this firm impingement of the complementary conical surfaces of the groove wall and washer body increases frictional coupling of the washer and nut, and thus cooperates to prevent inadvertent or unauthorized loosening after the fastener unit has been tightened against the work.

In other words, when the fastener unit is clamped against the work surface, the nut is frictionally secured against relative rotation with respect to the washer first by the locking engagement of the washer teeth with the clamping surface of the nut, and secondly by the frictional engagement of the complementary conical surfaces of the groove wall and nut body. The teeth on the underside of the lock washer embed themselves within the work surface, and any tendency for the washer body 32 to be laterally displaced with respect to the roots of the washer prongs 28 during the final tightening operation serves to set up additional frictional resistance to loosening. The lateral or axial displacement of the washer body makes it possible to increase the radial width of the body without increasing the outer diameter of the washer. Hence, a stronger body, without the necessity of increasing the outer diameter of the washer is provided.

To facilitate manufacture it is important to reduce to a minimum the depth of the groove 38. Hence, I prefer to form chamfer the free marginal edge of the washer body 32 so that the surface presented by said edge will be substantially coincident with a plane normal to the washer axis. That is to say, by removing a corner which would otherwise be present in this vicinity of the body stock, the required depth of the annular groove 38 is reduced materially.

All of the claims in this application are directed to the preassembled nut and washer assembly per se as distinguished from methods employed in the assembly of such parts.

While for purposes of disclosure certain specific embodiments have been illustrated, it will be understood that other embodiments are contemplated by the invention which come within the scope of the claims appended hereto.

I claim:

1. In a preassembled nut and lock washer including a washer member having an inner body in the form of an inwardly inclined continuous conoidal annulus with the free margin thereof providing an annular retaining section, said washer member having an outer locking section consisting of circumferentially spaced axially deflected locking portions extending outwardly from the base of said conoidal annulus, a nut member having an annular groove disposed closely adjacent the threaded bore of the nut to leave a clamping face substantially coextensive with said locking portions and a radially deformable annular skirt portion disposed radially interiorly of said clamping face, said annular groove being defined by wall surfaces extending inwardly from the clamping face and initially in relatively flaring position to provide a wide entrance to the groove facilitating insertion therein of said retaining section, said skirt portion being expanded radially outwardly after said insertion of the retaining section to reduce the width of the entrance to the groove and to approach and underlie the adjacent surface of the retaining section, thereby to prevent axial separation of the nut and washer while providing sufficient clearance to permit relative rotation of the washer and nut during tightening of the nut against a work surface.

2. In a preassembled nut and lock washer as claimed in claim 1, wherein the inner surface of the outwardly expanded skirt portion is outwardly inclined toward the free end thereof to provide a flared opening facilitating registration of a screw with the threaded bore of the nut.

3. In a preassembled nut and lock washer as claimed in claim 1, wherein the inclined base of the conoidal annulus below the said skirt portion presents a flared opening facilitating registration of a screw with the threaded bore of the nut.

4. In a preassembled nut and lock washer as claimed in claim 1, wherein the outer locking section of the washer member consists of a plurality of circumferentially spaced prongs extending radially outwardly from the base of said conoidal annulus, each of said prongs providing a locking tooth for engaging the nut on one side and a locking tooth for engaging the surface of a complementary work piece on the opposite side.

5. In a preassembled nut and lock washer as claimed in claim 1, wherein the surface presented by the free marginal edge of the conoidal washer body is substantially coincident with a plane normal to the axis of the washer.

OUGLJESA JULES POUPITCH.

REFERENCES CITED

The following references are of record in the file of this patent:

UNITED STATES PATENTS

| Number | Name | Date |
|---|---|---|
| 1,924,695 | Olson | Aug. 29, 1933 |
| 1,961,470 | Winchester et al. | June 5, 1934 |
| 2,227,464 | Olson | Jan. 7, 1941 |
| 2,424,208 | Poupitch | July 15, 1947 |

FOREIGN PATENTS

| Number | Country | Date |
|---|---|---|
| 540,864 | Great Britain | Nov. 3, 1941 |